(12) United States Patent
Metternich

(10) Patent No.: US 7,182,368 B2
(45) Date of Patent: Feb. 27, 2007

(54) SUPPORTING LEG FOR VEHICLE TRANSPORTING EXCHANGEABLE CONTAINERS

(75) Inventor: Heinz-Rüdiger Metternich, Hamburg (DE)

(73) Assignee: Hamburger Patent Schmiede GmbH, Hamburg (DE)

( * ) Notice: Subject to any disclaimer, the term of this patent is extended or adjusted under 35 U.S.C. 154(b) by 120 days.

(21) Appl. No.: 10/514,990

(22) PCT Filed: Jan. 23, 2003

(86) PCT No.: PCT/EP03/00643

§ 371 (c)(1),
(2), (4) Date: Nov. 19, 2004

(87) PCT Pub. No.: WO03/099684

PCT Pub. Date: Dec. 4, 2003

(65) Prior Publication Data

US 2005/0225066 A1    Oct. 13, 2005

(30) Foreign Application Priority Data

May 23, 2002    (DE)    ................................ 202 08 084

(51) Int. Cl.
    *B65D 90/14*    (2006.01)
(52) U.S. Cl. .................. 280/766.1; 280/764.1
(58) Field of Classification Search ............. 280/763.1, 280/764.1, 765.1, 766.1; 254/418, 419, 423, 254/424
See application file for complete search history.

(56) References Cited

U.S. PATENT DOCUMENTS

| | | | | | |
|---|---|---|---|---|---|
| 1,566,803 | A | * | 12/1925 | Morris | ..................... 280/766.1 |
| 2,417,619 | A | * | 3/1947 | Seyferth | ..................... 254/419 |
| 4,863,184 | A | * | 9/1989 | Mena | .......................... 280/475 |
| 5,579,862 | A | * | 12/1996 | Bowden et al. | ............. 180/287 |
| 6,267,357 | B1 | * | 7/2001 | Ebey et al. | ................... 254/419 |

FOREIGN PATENT DOCUMENTS

| | | |
|---|---|---|
| DE | 42 14 267 | 11/1993 |
| DE | 196 07 945 | 10/1996 |
| DE | 195 19 810 | * 12/1996 |
| EP | 0 024 996 | 3/1981 |
| WO | 94/04442 | * 3/1994 |
| WO | 94/26630 | * 11/1994 |

* cited by examiner

*Primary Examiner*—Frank Vanaman
(74) *Attorney, Agent, or Firm*—Merek, Blackmon & Voorhees, LLC

(57) ABSTRACT

A supporting leg for a vehicle that transports exchangeable containers comprises two telescopic tubes and a pneumatic drive for retracting and extending one of the tubes. Thread-type or annular bearing parts comprising a horizontal bearing surface are configured on the inner extendable tube. An engagement part with horizontal bearing surfaces, which interacts with the bearing parts, is located on the outer tube. The engagement part is pre-stressed in its displacement from the disengaged position to the engaged position in a spring-loaded manner and is fixed to the outer tube with a non-positive fit.

1 Claim, 5 Drawing Sheets

SUPPORTING LEG FOR VEHICLE TRANSPORTING EXCHANGEABLE CONTAINERS

BACKGROUND OF THE INVENTION

The invention refers to a supporting leg for vehicles transporting exchangeable containers to deposit the exchangeable container onto a horizontal base.

Exchangeable containers are usually transported by lorries or their trailers. The procedure in this respect is that the lorry takes up the exchangeable container together with the load and transports it to the desired location. There the exchangeable container is deposited and the vehicle can take on further loads. For the period, in which deposition occurs, it is required that the exchangeable container transfers the load resulting from the container and the respective goods through supporting legs onto the base. Usually the exchangeable containers comprise four supporting legs, wherein constructions with supporting legs pivotal around horizontal axes are known. (DE 196 07 945 A1).

SUMMARY OF THE INVENTION

The present invention has the object, to independently carry out this pivoting action or extension process of the supporting leg of the exchangeable container, i. e. design it such that the driver of the vehicle does not have to leave his driver's cabin for the deposition process.

This is achieved in that the exchangeable containers are provided with supporting legs according to the invention.

BRIEF DESCRIPTION OF THE DRAWINGS

The invention is explained below with reference to the figures by way of example.

DETAILED DESCRIPTION OF THE PREFERRED EMBODIMENT

Figure 1:
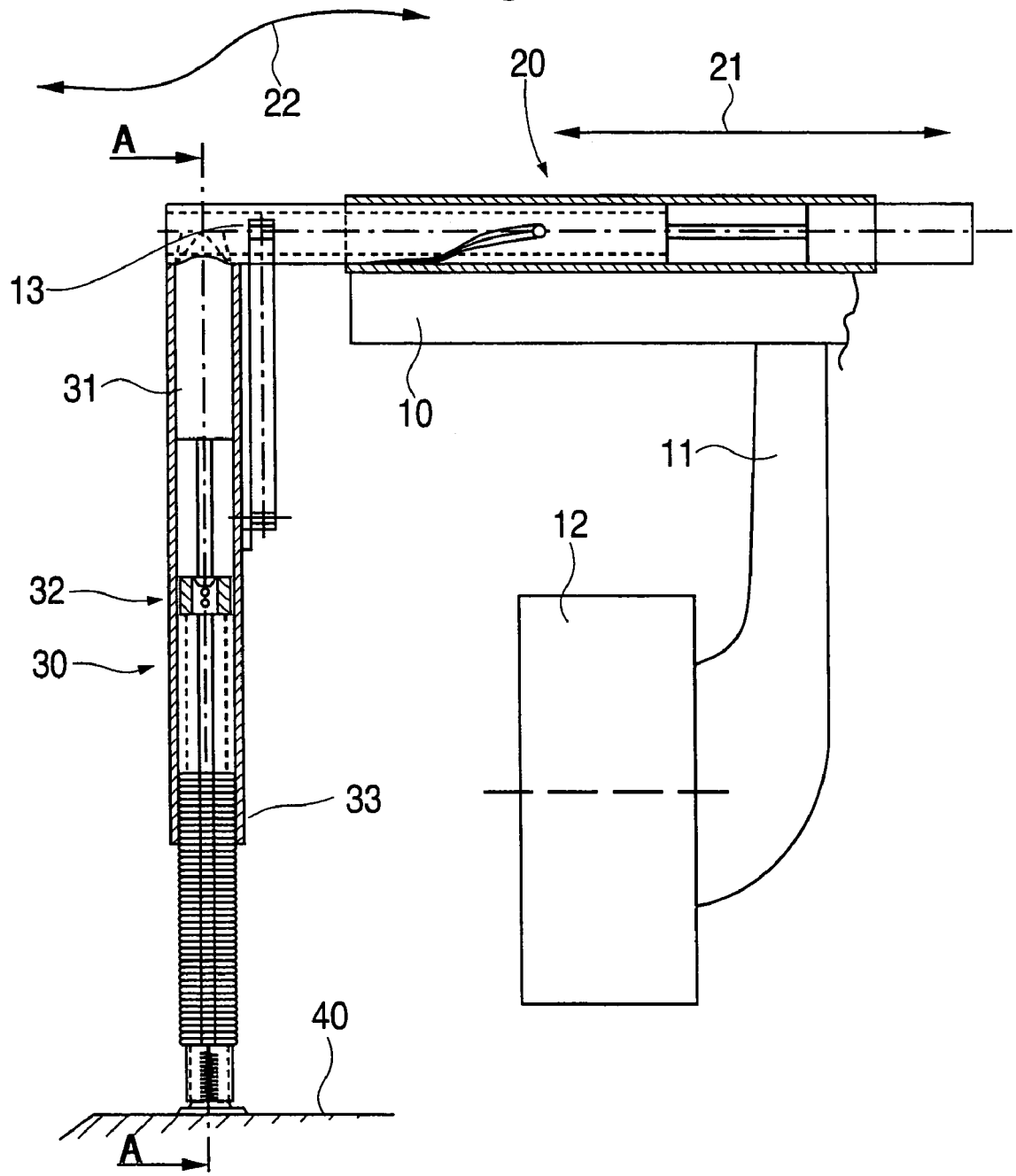
FIG. 1 shows a front view of an extended supporting leg bearing on a base.

In FIG. 1, a supporting leg is schematically illustrated such as it rests on a base. The supporting leg can be retracted and extended through an operating medium cylinder 31. The area 32 shows the connection of the piston rod of the cylinder 31 with the extendible tube 52 of the supporting leg. The area 33 shows the frictional connection of the outer tube 51 with an engaging part 60. In FIG. 1 these parts are schematically illustrated, they will be explained in detail by means of the description of the FIGS. 2 to 4.

The supporting leg 30 is pivotal around a horizontal axis, and that through a further operating medium cylinder 20, which generates a pivoting movement through a track extending over the circumference of a tube by retraction and extension of the piston rod. The retraction and extension direction of this operating medium cylinder is shown with the double arrows 21, while the pivoting movement resulting therefrom is symbolised by 22.

The pivoting leg 30 or its drive 20 is attached on a chassis 10 of a vehicle, not shown. A wheel support 11 for a wheel 12 is also shown at the chassis. In the shown position the exchangeable container or the chassis and all further indicated parts, respectively, rest through the supporting leg 30 on the floor 40 such that the wheel 12 is distanced from the floor.

Figure 2:
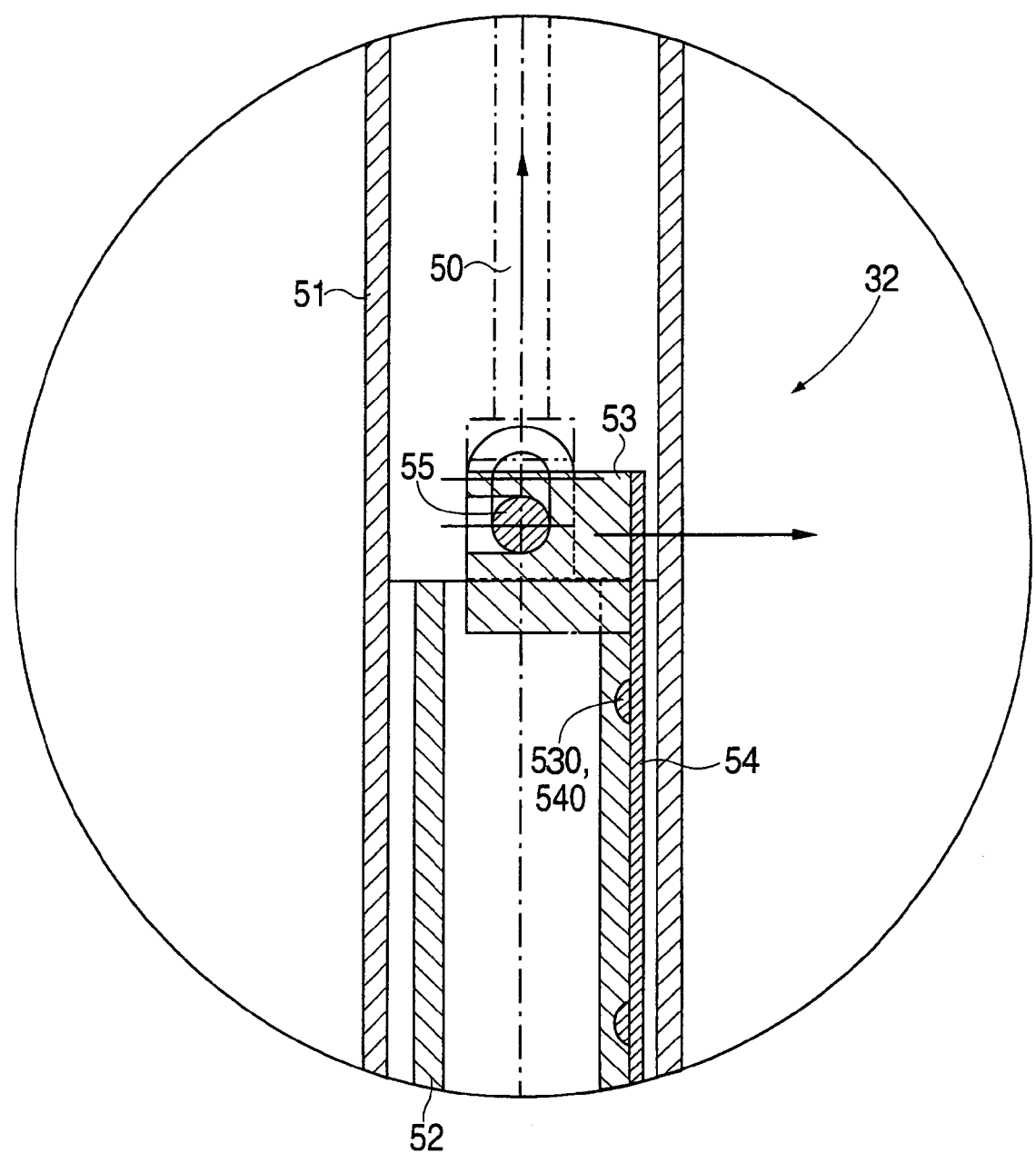
FIG. 2 shows details in the top area of the supporting leg in the first function.
Figure 3:
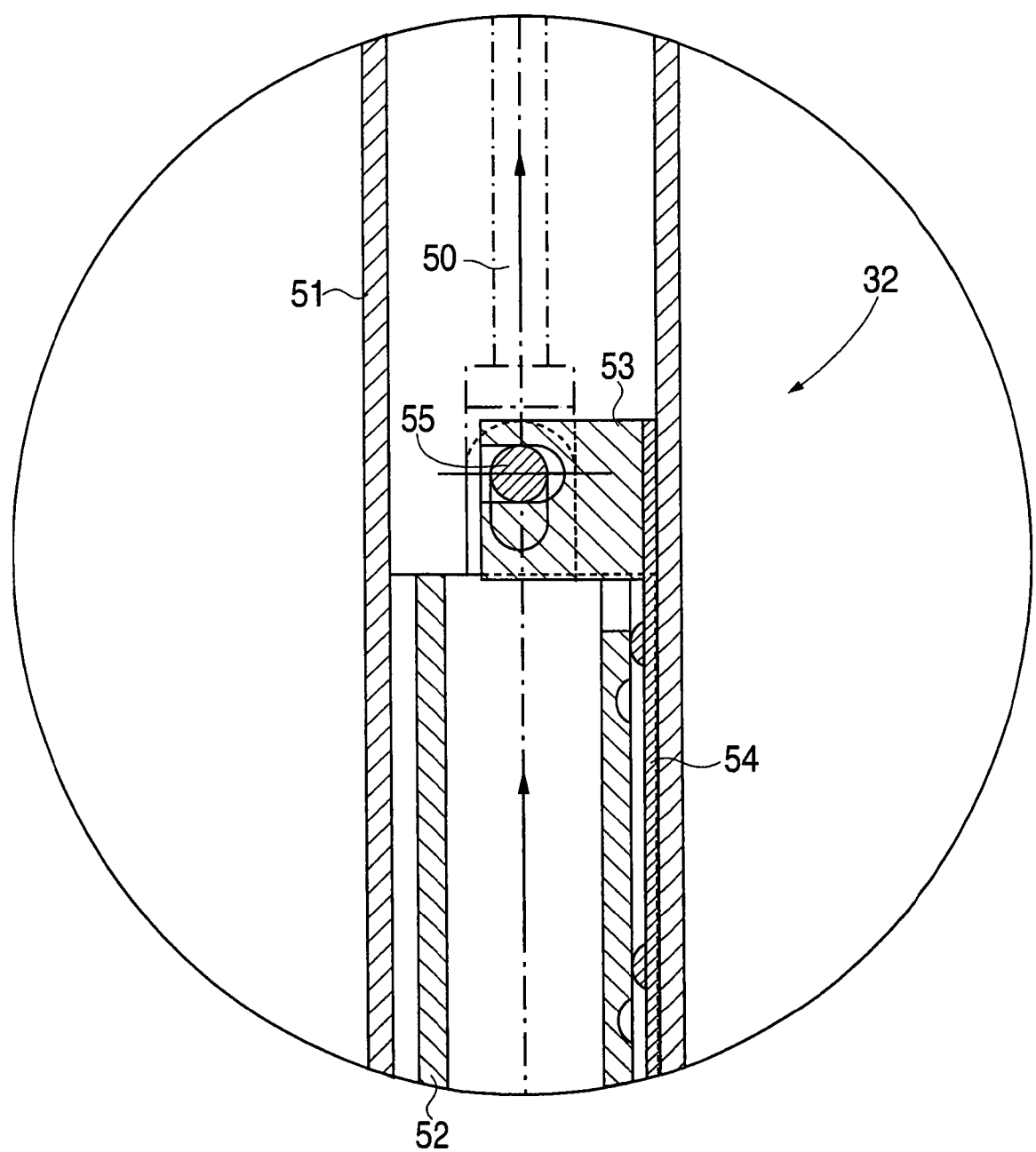
FIG. 3 shows this top area of the supporting leg during the second function.
Figure 4:
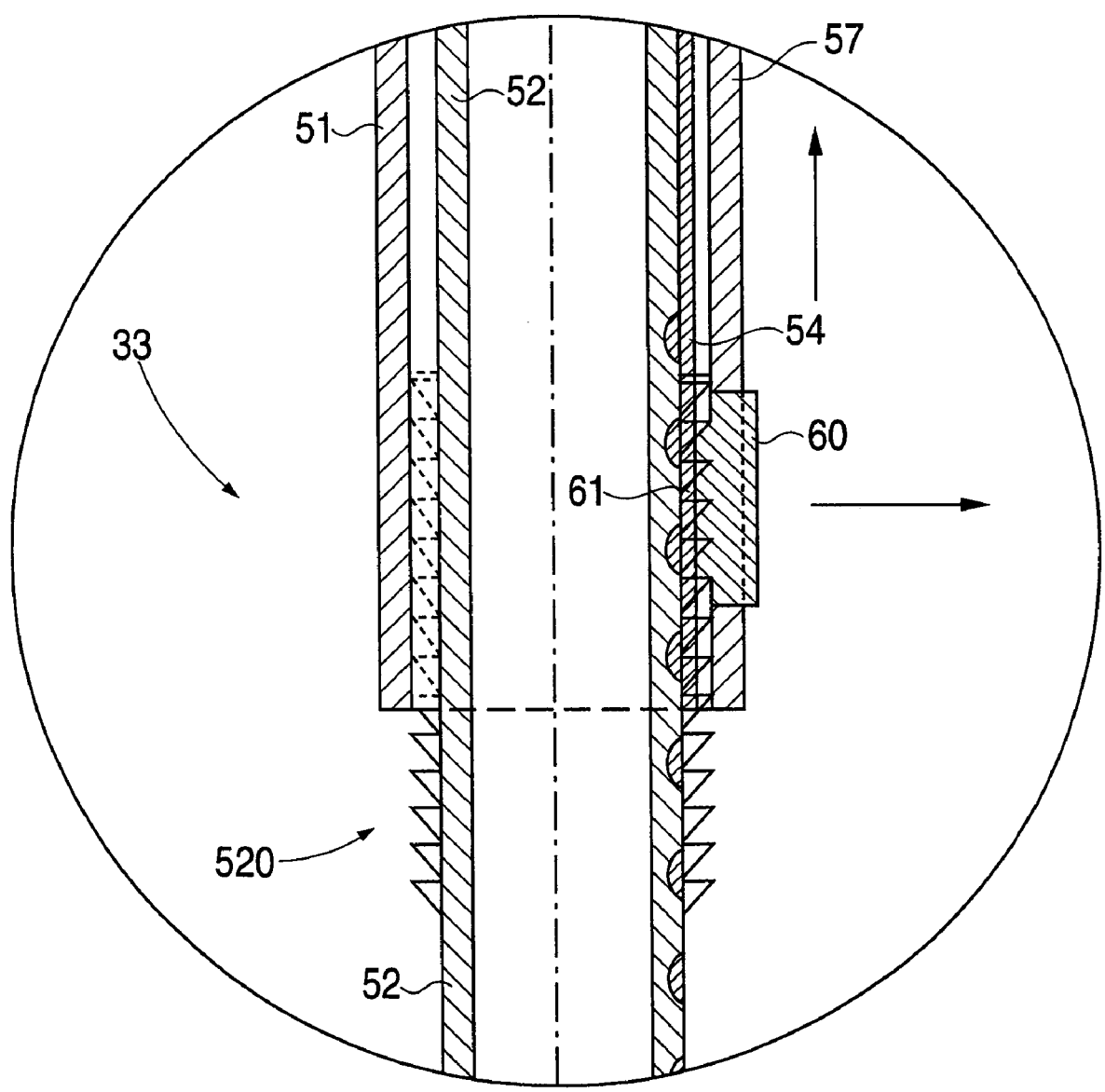
FIG. 4 shows the bottom area of the supporting leg in the first function.

The FIGS. 2 to 4 are taken in correspondence with the section line A—A.

FIG. 2 shows the outer telescoping tube 51 and the piston rod 50 provided therein. A transversely extending pin 55 is arranged at the end of the piston rod, which is housed in a longitudinal hole. The pin can assume two extreme positions in this longitudinal hole, the bottom position is shown in FIG. 2, the top position in FIG. 3.

The pin itself is arranged in a transversely extending recess of a block 53, which is extended downward through a rod-shaped part 54.

It appears from FIG. 2 that the piston rod 50 is not directly connected to the inner extendible tube 52, but through the block 53 or the rod 54, respectively. In FIG. 2 a recess in form of a ball can be seen in the outer area of the tube 52, in which a semicircular projection 540 is arranged, which is formed on the rod 54. The functioning of these parts will be explained with reference to the further figures.

FIG. 1 shows the first function of the parts and makes clear that through an upward movement of the piston rod 50 the inner tube 52 is moved upwards as well.

FIG. 3 shows the function in which the parts 530 and 540 are not engaged, and where the block 53 has assumed a position that is further towards the right with respect to the position in FIG. 2.

Figure 5:
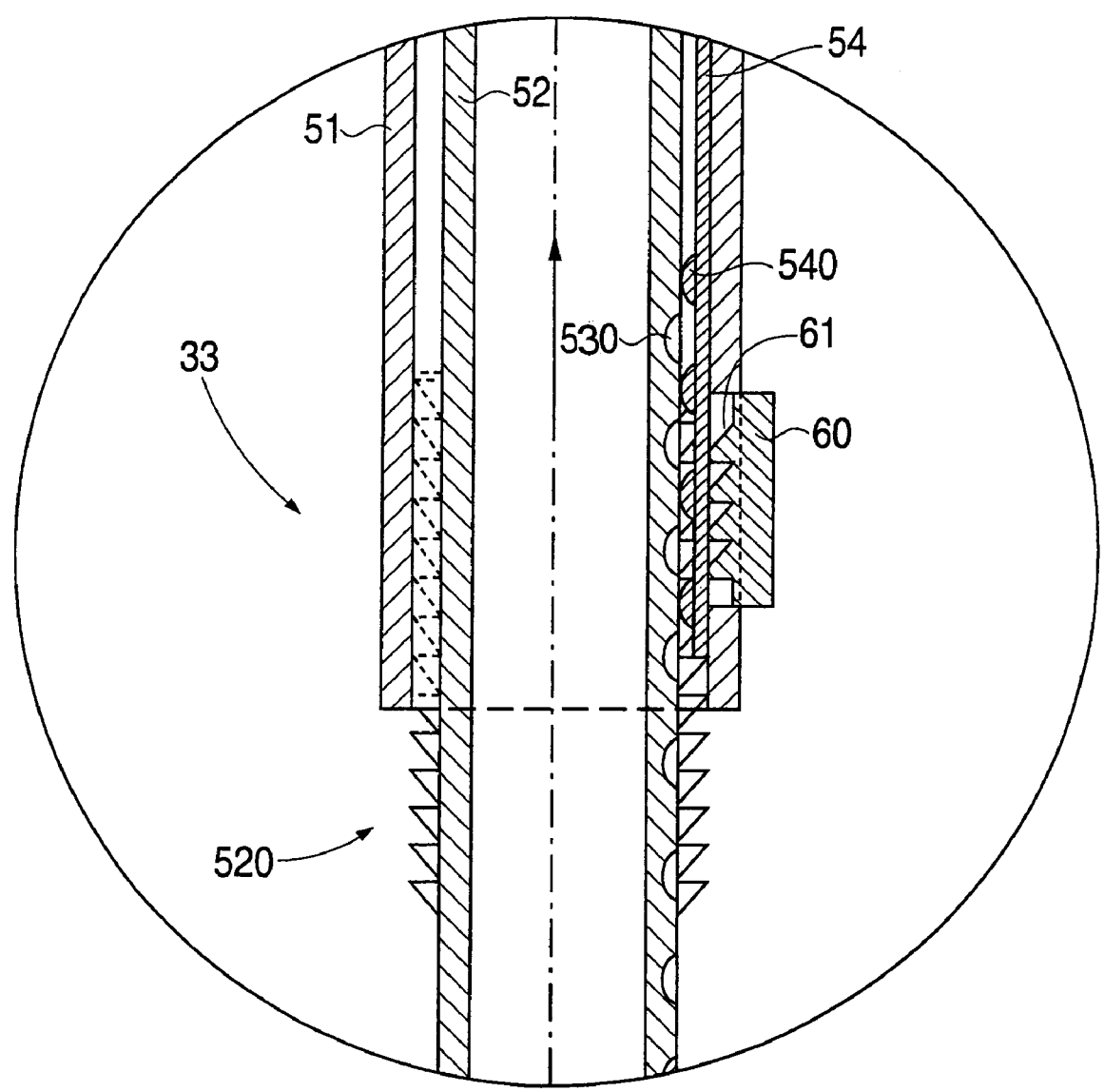
FIG. 5 shows the bottom area of the supporting leg in the second function.

The FIGS. 4 and 5 show the bottom parts of the supporting leg and the following shall be stated in this regard.

The extendible tube 52 is formed with a plurality of annular bearing parts 520. These comprise a horizontal surface facing upwards and extending obliquely starting from there. In the line of vision of FIG. 4 a saw tooth-shaped formation can be recognised.

A corresponding saw tooth-shaped formation can be seen at the engagement part 60, but the projections are facing in the opposite direction and are designated by 61. It can be seen in FIG. 4 that the projections 61 interact with the bearing parts 520 such that a force transmission from the tube 52 through the engagement part 60 to the outer tube 51 is possible, i. e. that in this position the exchangeable container can be set down on the foundation and the load is correspondingly passed on.

FIG. 5 shows the position in which the parts 540 have moved out of the recesses 530 on the inner tube 52. The rod 54 is pushed towards the right thereby and, thus, also is the engagement part 60. In this position a relative movement between the telescopic tubes 51 and 52 can occur.

The engagement part 60 is situated in a kind of window of the outer tube 51 and can carry out the desired inward and outward movements. Not shown is a spring bias, which makes sure that the engagement part 60 will move into the engagement position.

The invention claimed is:

1. A supporting leg for a vehicle transporting exchangeable containers for the deposition of an exchangeable container onto a horizontal base, comprising two telescoping tubes and a pneumatic drive for retracting and extending the tubes wherein bearing parts (520) comprising a horizontal bearing surface are configured on the inner extendible tube (52), and an engagement part (60) with horizontal bearing surfaces, which engages the bearing parts (520), is located on the outer tube (51), and is elastically biased from a disengaged position to an engagement position and is fixed in a frictional manner on the outer tube (51), characterized in that

- the inner extendible tube (52) is connected through a block (53) and a rod (54) with a piston rod (50) of the pneumatic drive (31),
- in an outer area of the inner extendible tube (52), a semicircular recess (530) is provided for reception of a semicircular projection (540) on the rod (54), and
- the rod (54) is shifted out of a position in which the semicircular recess is received in the semicircular projection, and the engagement part (60) is shifted out of its engagement position, allowing a relative movement between the tubes (51, 52), in the inward and outward movement, respectively, of the piston rod (50).

* * * * *